(12) United States Patent
Krammer

(10) Patent No.: US 10,933,757 B2
(45) Date of Patent: Mar. 2, 2021

(54) MESHWORK AND DEVICE FOR DETECTING AN OBJECT IN A MAGNETIC FIELD, METHOD FOR PRODUCING THE MESHWORK, AND INDUCTIVE CHARGING UNIT

(71) Applicant: Bayerische Motoren Werke Aktiengesellschaft, Munich (DE)

(72) Inventor: Josef Krammer, Holzkirchen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 76 days.

(21) Appl. No.: 16/375,421

(22) Filed: Apr. 4, 2019

(65) Prior Publication Data

US 2019/0225100 A1   Jul. 25, 2019

Related U.S. Application Data

(63) Continuation of application No. PCT/EP2017/075177, filed on Oct. 4, 2017.

(30) Foreign Application Priority Data

Oct. 7, 2016 (DE) .................... 10 2016 219 484.4

(51) Int. Cl.
*B60L 53/124* (2019.01)
*G01V 3/10* (2006.01)
(Continued)

(52) U.S. Cl.
CPC .............. *B60L 53/124* (2019.02); *G01V 3/10* (2013.01); *H02J 7/025* (2013.01); *H02J 50/10* (2016.02);
(Continued)

(58) Field of Classification Search
CPC ............................ B60L 53/122; B60L 53/124
(Continued)

(56) References Cited

U.S. PATENT DOCUMENTS 5,548,218 A    8/1996  Lu
9,895,989 B2 *  2/2018  Czainski ................. B60L 5/005
(Continued)

FOREIGN PATENT DOCUMENTS

CN    102157988 A    8/2011
CN    102187504 A    9/2011
(Continued)

OTHER PUBLICATIONS

Chinese-language Office Action issued in Chinese Application No. 201780061112.X dated Apr. 16, 2020 with English translation (21 pages).

(Continued)

*Primary Examiner* — Jerry D Robbins
(74) *Attorney, Agent, or Firm* — Crowell & Moring LLP

(57) ABSTRACT

A meshwork for detecting an object in a magnetic field is provided. The meshwork includes a plurality of sensor lines. The sensor lines are connected together parallel to one another in a first direction. The sensor lines define multiple meshes in a second direction running transversely to the first direction. The respective meshes of adjacent sensor lines are coupled together such that the sensor lines form the meshwork. A device for detecting an object in a magnetic field, a method for producing the meshwork, and an inductive charging unit are also provided.

18 Claims, 12 Drawing Sheets

(51) Int. Cl.
*H02J 50/60* (2016.01)
*H02J 7/02* (2016.01)
*H02J 50/10* (2016.01)
*H01F 38/14* (2006.01)

(52) U.S. Cl.
CPC .............. *H02J 50/60* (2016.02); *H01F 38/14* (2013.01); *Y02T 10/70* (2013.01); *Y02T 10/7072* (2013.01); *Y02T 90/12* (2013.01); *Y02T 90/14* (2013.01)

(58) Field of Classification Search
USPC ........................................................ 320/108
See application file for complete search history.

(56) References Cited

U.S. PATENT DOCUMENTS

| | | |
|---|---|---|
| 2001/0050176 A1 | 12/2001 | Gebhardt et al. |
| 2011/0183166 A1* | 7/2011 | Suga ................ H01M 2/30 429/61 |
| 2013/0069441 A1 | 3/2013 | Verghese et al. |
| 2013/0169062 A1* | 7/2013 | Maikawa ........... H01F 38/14 307/104 |
| 2014/0111019 A1 | 4/2014 | Roy et al. |
| 2015/0293253 A1 | 10/2015 | Eiermann et al. |
| 2015/0321567 A1* | 11/2015 | Czainski .......... B60L 53/124 191/10 |
| 2016/0238731 A1 | 8/2016 | Chopra et al. |
| 2016/0282500 A1 | 9/2016 | Filippenko et al. |
| 2017/0012674 A1* | 1/2017 | Huber ................ H04B 5/0037 |
| 2017/0248726 A1 | 8/2017 | Adachi |

FOREIGN PATENT DOCUMENTS

| | | |
|---|---|---|
| CN | 103875159 A | 6/2014 |
| DE | 100 25 582 C1 | 12/2001 |
| DE | 10 2014 207 253 A1 | 10/2015 |
| DE | 10 2015 212 947 A1 | 1/2017 |
| WO | WO 2010/046745 A1 | 4/2010 |
| WO | WO 2013/036947 A2 | 3/2013 |
| WO | WO 2016/031209 A1 | 3/2016 |

OTHER PUBLICATIONS

International Search Report (PCT/ISA/210) issued in PCT Application No. PCT/EP2017/075177 dated Dec. 14, 2017 (five (5) pages).

German-language Written Opinion (PCT/ISA/237) issued in PCT Application No. PCT/EP2017/075177 dated Dec. 14, 2017 (six (6) pages).

German-language Search Report issued in counterpart German Application No. 10 2016 219 484.4 dated May 5, 2017 with partial English translation (12 pages).

* cited by examiner

MESHWORK AND DEVICE FOR DETECTING AN OBJECT IN A MAGNETIC FIELD, METHOD FOR PRODUCING THE MESHWORK, AND INDUCTIVE CHARGING UNIT

CROSS REFERENCE TO RELATED APPLICATIONS

This application is a continuation of PCT International Application No. PCT/EP2017/075177, filed Oct. 4, 2017, which claims priority under 35 U.S.C. § 119 from German Patent Application No. 10 2016 219 484.4, filed Oct. 7, 2016, the entire disclosures of which are herein expressly incorporated by reference.

BACKGROUND AND SUMMARY OF THE INVENTION

The invention relates to a meshwork for object recognition in a magnetic field. Furthermore, the invention relates to a corresponding device for object recognition in a magnetic field, and to a method for producing the meshwork. Finally, the invention relates to a corresponding inductive charging unit.

Foreign bodies are undesirable in a magnetic field of an inductive charging unit; they can reduce the charging efficiency. Stringent requirements are made of devices for foreign body detection and result in complex and cost-intensive production of the charging units.

An objective on which the invention is based is to provide a meshwork and a corresponding device for object recognition in a magnetic field, a method for producing the meshwork and also a corresponding inductive charging unit which contribute to keeping down complexity and costs during the production of the charging unit.

This and other objectives are achieved by way of the features in accordance with embodiment of the invention.

In accordance with a first aspect, the invention relates to a meshwork for object recognition in a magnetic field. The meshwork includes a plurality of sensor lines arranged in a manner strung together parallel to one another in a first direction. The sensor lines span a plurality of meshes in a second direction extending transversely with respect to the first direction. The meshes of adjacent sensor lines are respectively coupled to one another, such that the sensor lines form the meshwork.

The meshwork advantageously enables reliable detection of foreign bodies in the magnetic field. No circuit board is required for this, however, and so a material outlay, weight, structural space volume and costs of a device for object recognition in a magnetic field can be kept low. In particular, the meshwork enables a high flexibility in the adaptation of such a device to the area of an energy transmission coil of an inductive charging unit with regard to standardized printed circuit board manufacture and size. A printed circuit board is advantageously avoided; rather, the meshwork replaces the printed circuit board with coils of conductor tracks. The meshwork can advantageously be produced simply and cost-effectively using established concepts and machines. In this case, in particular, a number of turns and mesh size can easily be adapted to the stated objective.

The sensor lines are arranged substantially parallel in the first direction. The second direction is in particular perpendicular to the first direction. The coupled meshes span a meshwork extending in the first and second directions. The meshes form in particular sensor coils of a device for object recognition in a magnetic field. The sensor line is preferably formed from an enameled wire. Individual sensor coils can be connected in series in this case. In particular, the sensor coils connected in series can be wound in the same sense. Each mesh can in particular comprise or consist of a plurality of wire loops, wherein a wire loop respectively forms a turn of the respective sensor coil.

In one advantageous configuration in accordance with the first aspect, the meshes of adjacent sensor lines respectively intermesh, such that the meshwork is formed in a concatenated fashion.

This advantageously enables a mechanically robust and flexible embodiment of the meshwork.

In a further advantageous configuration in accordance with the first aspect, the meshwork includes coupling elements. The meshes of adjacent sensor lines are respectively coupled to one another by way of a coupling element.

By way of example, holders or clips are considered as coupling elements.

In a further advantageous configuration in accordance with the first aspect, the sensor lines respectively have a first section extending in the second direction and a second section extending counter to the second direction. In this case, each of the meshes is formed from the first and second sections. The sensor line is furthermore formed in such a way that the second section crosses over the first section at a beginning of each mesh in relation to the second direction and/or at an end of each mesh in relation to the second direction.

This advantageously enables a mechanically robust and flexible embodiment of the meshwork. In addition, by way of example, the meshes of adjacent sensor lines can respectively intermesh, thus giving rise to a particularly mechanically robust and flexible meshwork in the manner of a wire meshing.

In a further advantageous configuration in accordance with the first aspect, the meshwork includes coupling elements. The sensor lines respectively have a first section extending in the second direction and a second section extending counter to the second direction. In this case, each mesh is formed from the first and second sections. The second section is furthermore coupled to the first section by way of a coupling element at a beginning of each mesh in relation to the second direction and/or at an end of each mesh in relation to the second direction.

This advantageously enables a flexible shaping of the mashes. In addition, by way of example, the meshes of adjacent sensor lines can respectively be coupled to one another by way of a coupling element, thus enabling a flexible shaping of a pattern of the meshwork.

In a further advantageous configuration in accordance with the first aspect, the meshes respectively enclose an area whose size varies. The size varies here in such a way that a size ratio of the areas with respect to one another is between 0.5 and 2.

Inhomogeneities of the magnetic field can thus advantageously be taken into account. By way of example, in a region with field strength of comparatively high magnitude, jeopardization by foreign bodies is particularly high, and so a more accurate detection is desired there. The size of the meshes arranged there can then be chosen to be smaller, for example, than in regions with field strength of lower magnitude.

In accordance with a second aspect, the invention relates to a device for object recognition in a magnetic field. The device includes a first meshwork in accordance with the first aspect and evaluation electronics for object recognition. The evaluation electronics are coupled to the sensor lines of the first meshwork in terms of signaling.

A device of this type is advantageously free of a circuit board of the evaluation electronics. By virtue of the sensor lines spanning the meshwork, it is possible simultaneously to realize a connection line to the evaluation electronics, such that additional plug connections can be avoided. By way of example, for this purpose, the individual sensor lines are led out over a length to a plug connector that can be led directly to a circuit board of the evaluation electronics.

Advantageously, the device thus has a comparatively small sensitive portion which can be arranged variably on account of the flexible connection by way of the sensor lines.

In one advantageous configuration in accordance with the second aspect, the device includes a further meshwork in accordance with the first aspect. In this case, the further meshwork is arranged at a distance from the first meshwork parallel to the first meshwork in a third direction extending transversely with respect to the first and second directions. The sensor lines of the further meshwork are likewise coupled to the evaluation electronics in terms of signaling.

Advantageously, it is thereby possible to increase a number of turns of the sensor coils formed by the meshes and thus to contribute to a detection sensitivity of the device. Alternatively or additionally, gaps in the first meshwork can be closed by the further meshwork. Alternatively or additionally, inhomogeneities of the magnetic field can furthermore be taken into account by means of the further meshwork.

In a further advantageous configuration in accordance with the second aspect, the meshes of the first meshwork respectively enclose a first area. Furthermore, the meshes of the further meshwork respectively enclose a further area. In this case, a size ratio of the first area to the further area is between 0.5 and 2.

This advantageously makes it possible to take account of inhomogeneities of the magnetic field. In particular, a detection sensitivity and/or degree of detail of the detection can be increased in this case.

In accordance with a third aspect, the invention relates to a method for producing a meshwork for object recognition in a magnetic field. In the method, a plurality of sensor lines are provided. Afterward, the sensor lines are arranged in a manner strung together parallel to one another in a first direction. In this case, the sensor lines are arranged in such a way that they respectively span a plurality of meshes in a second direction extending transversely with respect to the first direction. Here the meshes of adjacent sensor lines are respectively coupled to one another, such that the sensor lines form the meshwork.

Advantageously, the meshwork can be produced particularly simply and cost-effectively. In particular, methods of wire meshing production and/or additional modifications thereof can be used for producing the meshwork. Clipping or further methods like those from textile production can also be used in this case.

In one advantageous configuration in accordance with the third aspect, the method comprises the following steps:
a) providing a first sensor line of the plurality of sensor lines, which forms a plurality of first meshes,
b) providing a further sensor line of the plurality of sensor lines having a first and a second section,
c) arranging the sensor lines in a manner strung together parallel to one another in the first direction in such a way that the sensor lines respectively span a plurality of meshes in the second direction extending transversely with respect to the first direction, and respectively coupling the meshes of adjacent sensor lines to one another, such that the sensor lines form the meshwork, by carrying out the following steps:
c1) guiding the further sensor line in the second direction through the first meshes in such a way that the first section of the further sensor line crosses over the first sensor line at a beginning of each first mesh in relation to the second direction and at an end of each first mesh in relation to the second direction,
c2) pulling the first section of the further sensor line by way of a first comb respectively between crossover points of the first and further sensor lines in the first direction, such that an area segment is respectively enclosed between the first section of the further sensor line and the first meshes,
c3) guiding the second section of the further sensor line counter to the second direction through the area segments, in such a way that the second section of the further sensor line crosses over the first section of the further sensor line at an end of each first mesh in relation to the second direction and at a beginning of each first mesh in relation to the second direction, and
c4) pulling the second section of the further sensor line by way of a second comb respectively between crossover points of the first and second sections of the further sensor line in the first direction, such that further meshes are respectively formed by the first and second sections of the further sensor line.

The method described enables particularly simple, cost-effective production of the meshwork.

In a further advantageous configuration in accordance with the third aspect, an end of the second section that is guided out of the meshwork counter to the second direction serves as further sensor line having a respective first and second section. Steps c1) to c4) are carried out once again with the led-out end of the second section as a further sensor line.

Advantageously, this makes it possible to increase the number of turns of the sensor coils formed by the meshes, with the result that it is possible to contribute to a detection sensitivity.

In a further advantageous configuration in accordance with the third aspect, the meshwork is produced by one of either embroidering, weaving or clipping of the sensor lines.

In accordance with a fourth aspect, the invention relates to an inductive charging unit for a vehicle. The charging unit includes a primary coil for inductive coupling to a secondary coil assigned to the vehicle, and a device for object recognition in accordance with the second aspect.

Advantageously, the device can be integrated into a housing of the charging unit in a simple manner on account of the flexible meshwork. By way of example, for this purpose the meshwork is laminated into a glass fiber reinforced plastic of the housing. The evaluation electronics can be arranged in a protected region of the housing in a dedicated manner on account of the flexible connection line. A contribution to a mechanical robustness of the charging unit is advantageously made in this way.

In accordance with a further aspect, the invention relates to an inductive charging unit for a vehicle. The charging unit includes a secondary coil for inductive coupling to a primary coil assigned to a ground unit, and a device for object recognition in accordance with the second aspect. The charging unit in accordance with the fifth aspect can in particular be configured analogously to the charging unit in accordance with the fourth aspect and have similar advantages.

In one advantageous configuration in accordance with the fourth or fifth aspect, the device is arranged in such a way that voltages induced in the meshes by a magnetic field of the primary coil during operation of the charging unit respectively compensate for one another.

Advantageously, the sensor coils formed by the meshes of the meshwork can then be wound in opposite senses or in the same sense. Advantageously, a meshwork in accordance with the first or third aspect can thus be used in the charging unit.

Particularly in the case where the device or the meshwork is arranged symmetrically relative to the respective coil, the voltages induced in the meshes can respectively compensate for one another.

In a further advantageous configuration in accordance with the fourth or fifth aspect, the charging unit includes a housing with holding elements. The meshwork is clamped in a fixing fashion in the housing by way of the holding elements.

Exemplary embodiments of the invention are explained in greater detail below with reference to the schematic drawings. Other objects, advantages and novel features of the present invention will become apparent from the following detailed description of one or more preferred embodiments when considered in conjunction with the accompanying drawings.

BRIEF DESCRIPTION OF THE DRAWINGS

FIGS. 5 to 8 are illustration of a foreign body in the magnetic field.

DETAILED DESCRIPTION OF THE DRAWINGS

Elements of identical design or function are provided with the same reference signs throughout the figures.

Figure 1:
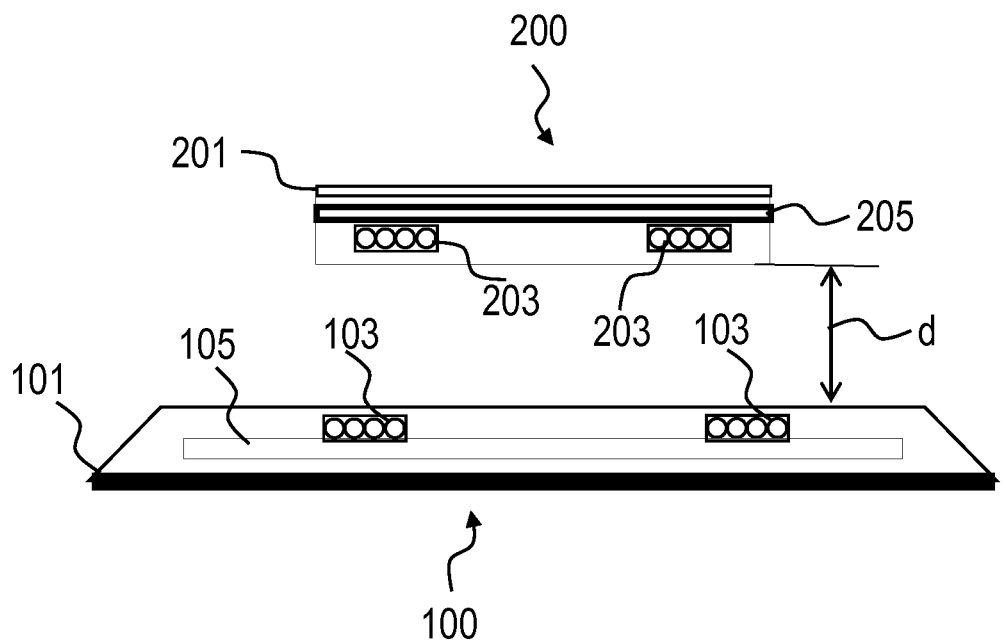
FIG. 1 is a construction of an inductive charging system in sectional view.

FIG. 1 shows a construction of an inductive charging system, including a first charging unit 100, which for example is arranged on the ground and can also be referred to as a ground unit, and also a second charging unit 200, which for example is assigned to a vehicle and is arranged on the underbody thereof.

The first charging unit 100 includes a housing 101, a primary coil 103 arranged in the housing 101, and also a ferrite 105. Analogously thereto, the second charging unit 200 likewise includes a housing 201, a secondary coil 203 and also a ferrite 205.

For the purpose of inductively charging the vehicle, the two charging units 100, 200 are arranged one above another at a predefined distance d. Energy is transferred by way of magnetic coupling of the primary and secondary coils 103, 203. On account of the large air gap between the charging units 100, 200, the coils 103, 203 are only loosely coupled.

The second charging unit 200 can include a capacitor besides the secondary coil 203 for impedance matching purposes. Moreover, by way of example, a rectifier, vehicle-side control electronics, a WLAN interface and a high-voltage energy store are assigned to the vehicle in this context.

Figure 2:
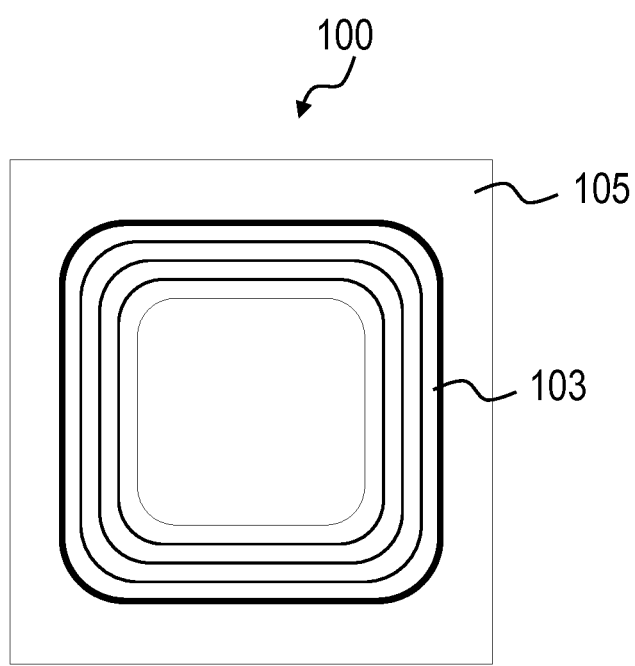
FIG. 2 is an inductive charging unit in plan view.

FIG. 2 shows for example a construction of the first charging unit 100 in plan view. The second charging unit 200 has, in principle, a construction identical to the first charging unit 100, but mirrored vertically.

Figure 3:
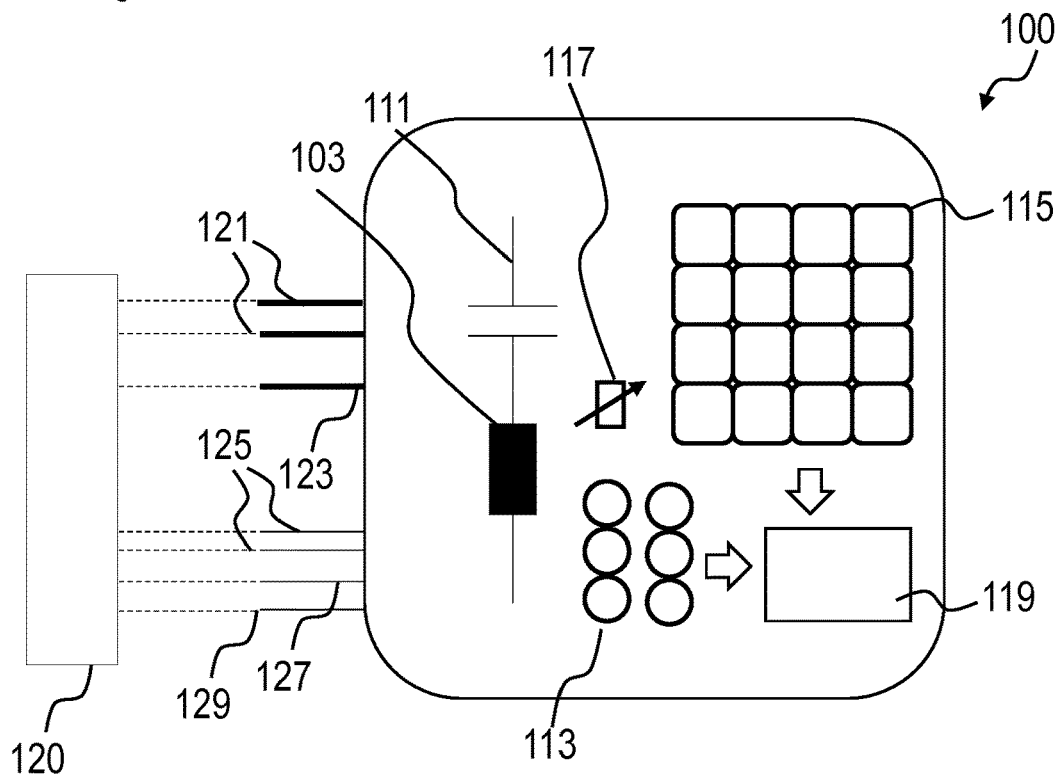
FIG. 3 is the inductive charging unit in a detailed view.

FIG. 3 shows the first charging unit 100 once again in a schematic detailed view with impedance matching and additional functional components. Besides the primary coil 103 and the ferrite 105 (not illustrated in more specific detail here), the first charging unit 100 includes for example a resonance capacitor 111, which is coupled to the primary coil 103. Furthermore, the first charging unit 100 includes for example a positioning unit 113 for guiding and/or positioning the vehicle having the second charging unit 200 above the first charging unit 100, for example including six sensor coils, an FOD unit 115, ("Foreign Object Detection", FOD) for detecting foreign bodies in the magnetic field of the first charging unit 100, for example including sixty sensor coils, a temperature sensor 117 and a control unit 119 for signal evaluation. In order to protect the two charging units 100, 200, in the case where the FOD unit 115 detects a metallic foreign body, the primary coil 103 can be switched off.

Furthermore, the first charging unit 100 has a supply input 121, for example an RF multiple-stranded wire, via which the first charging unit 100 is supplied with electrical energy, for example having a frequency of 85 kHz. Furthermore, the first charging unit 100 has a protective conductor input 123 and communication inputs 125, 127 and 129. By way of example, the communication inputs 125 are configured for communication by way of a CAN protocol, while a voltage of 12 V is present at the input 127 and a reference potential is present at the input 129. Optionally, part of the electronics or the entire electronics of the first charging unit 100 can for example also be arranged externally in a wall unit 120 (so-called "wallbox") and be coupled to the first charging unit 100 via the inputs 121-129. The wall unit 120 can have for example a power supply, by way of example with 230 V AC with inverter, power regulation, WLAN interface and internet connection.

Figure 4:
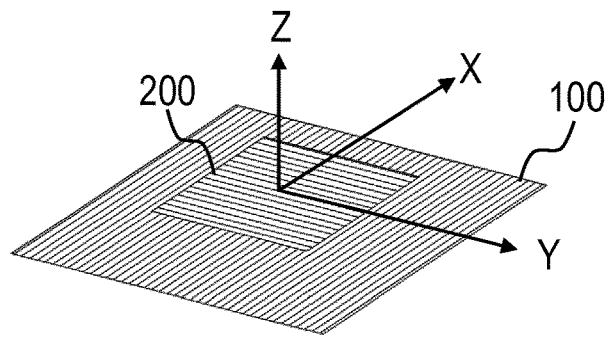
FIG. 4 is the inductive charging system in a perspective oblique view.

FIG. 4 shows the charging system once again in a perspective oblique view. The two charging units 100, 200 extend parallel to one another in a first direction X and a second direction Y, at a distance from one another in a third direction Z. A space between the two charging units 100, 200 for energy transfer is "flooded" with magnetic flux density during the operation of said charging units. If metallic or conductive foreign bodies 10 (FIG. 5) were present there, they would be heated. In order to prevent this in principle or at least to prevent excessive heating, the space is monitored by way of an FOD unit 115. In the event of metallic objects 10 being present, the energy transfer or the magnetic field can be switched off. Optionally, a warning can be communicated to a user.

Figure 5:
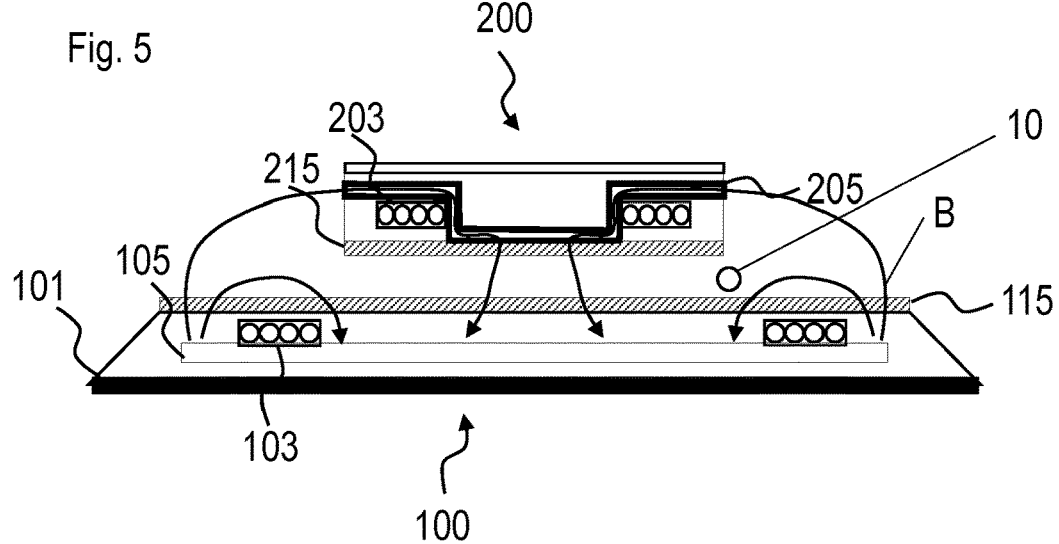
FIG. 5 is the inductive charging system in sectional view with magnetic field lines illustrated by way of example.

FIG. 5 illustrates a few magnetic field lines B by way of example. In this case, the flux density of the magnetic field during the operation of the two charging units 100, 200 has a high magnitude in the ferrites 105, 205. Near the turns of the coils 103, 203, the flux density already has a lower magnitude, and decreases further within the air gap between the two charging units 100, 200. The flux density has a very low magnitude outside the air gap. The electrically conductive and/or ferromagnetic object 10 illustrated in FIG. 5 is situated in the region of high field strength.

Figure 6:
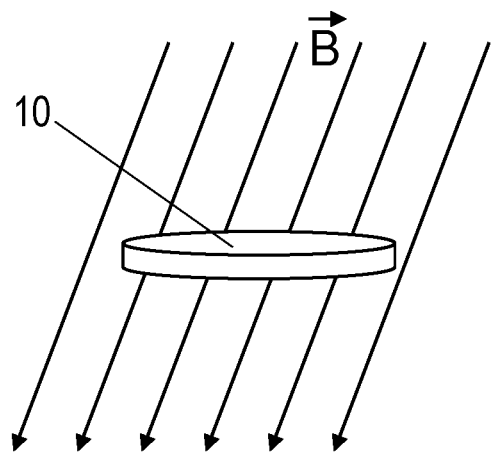

The object 10 is for example a flat disk such as a coin (FIG. 6). In the object 10, according to the law of induction $$\oint_{\partial A(t)} \vec{E} \cdot d\vec{s} = -\int_{A(t)} \frac{\partial \vec{B}}{\partial t} \cdot d\vec{A}$$

a voltage is induced in the circumference of the object 10, said voltage corresponding to a change in the magnetic flux through the area of said object. Accordingly, the effect thus becomes smaller if the disk is not perpendicular to the magnetic field lines B (less flux through the disk) and almost completely vanishes if the disk is oriented parallel to the magnetic field lines B.

Figure 7:
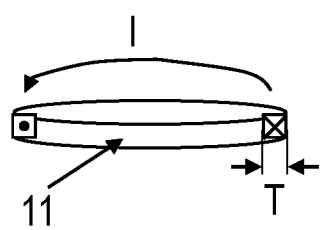
Figure 8:
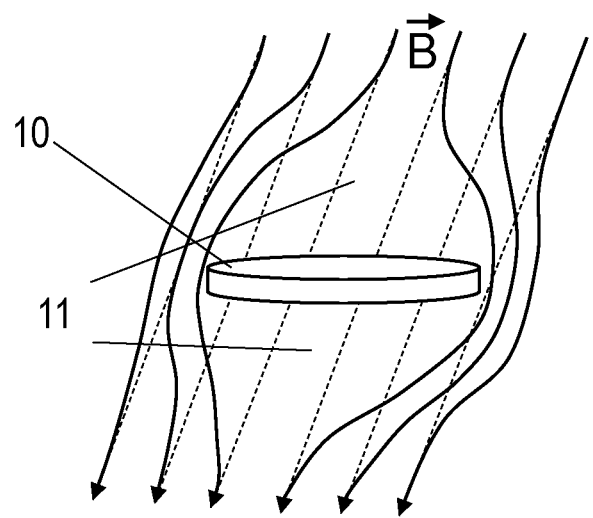

As illustrated in FIG. 7, this leads to a current flow I at the edge of the object 10 as far as a penetration depth T on account of the skin effect. A field-free region 11 remains in the interior of the object 10. The current flow I in turn generates an oppositely directed magnetic field that is superposed with the magnetic field lines B, thus giving rise to a field-free region around the object 10 (see FIG. 8). Losses arise as a result of ohmic losses at the resistance of the current flow I constricted owing to the skin effect at the circumference of the object 10.

Figure 9A:
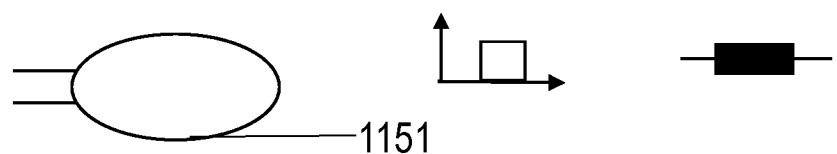
FIGS. 9A to 9D show methods for foreign body detection.

In order to detect the object 10, it is possible to use sensor coil arrays as FOD unit 115, for example, which function in a manner similar to a conventional metal detector, as illustrated with reference to FIGS. 9A-9D. In particular, various measurement methods are contemplated here:

FIG. 9A shows (from left to right) a sensor coil 1151, an excitation coil and an equivalent circuit diagram in the case of pulse measurements; a decay time constant is considered here as a typical characteristic variable.

Figure 9B:
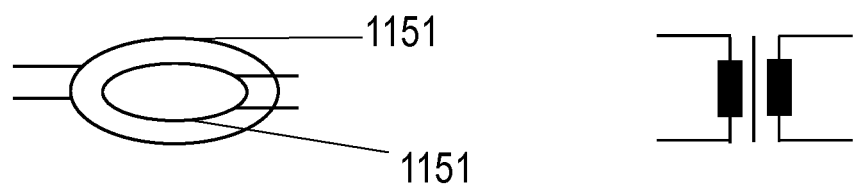

FIG. 9B shows (from left to right) two coupled sensor coils 1151 and an equivalent circuit diagram in the case of measurement by way of AC excitation; induced voltage and phase are considered here as a typical characteristic variable.

Figure 9C:
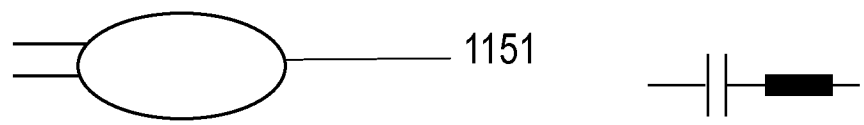

FIG. 9C shows (from left to right) a sensor coil 1151 and an equivalent circuit diagram in the case of resonance measurement under AC excitation; a resonant frequency is considered here as a typical characteristic variable.

Figure 9D:
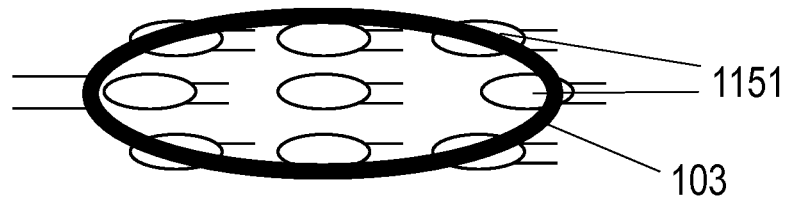

FIG. 9D, finally, shows a plurality of sensor coils 1151 and a primary coil 103 (alternatively, a secondary coil 203 can also be used) in the case of analysis of the magnetic field of the energy transfer; induced voltage and phase are considered here as a typical characteristic variable.

As already illustrated in FIG. 5, the FOD unit 115 can be arranged in a plane directly above the primary coil 103 within the housing 101. Alternatively or additionally, analogously thereto, an FOD unit 215 can also be arranged in a plane directly below the secondary coil 203 within the housing 201. A construction of these FOD units 115, 215 can be implemented by way of a printed circuit board, for example, which covers an entire area above and respectively below the coil 103, 203. Sensor coils 1151 for detecting the object 10 by way of the measurement methods described with reference to FIGS. 9A-9D are realized by means of correspondingly shaped conductor tracks. The region with magnetic flux density of high magnitude is monitored using the large area above and respectively below the coil 103, 203 that is used for energy transfer. At least a two-layered embodiment is demanded for the printed circuit board in order to be able to produce crossovers. Components need not be equipped apart from the contacting.

In order to be able to recognize all relevant foreign bodies 10 in all possible positions, very many sensor coils 1151, for example, can be realized on the printed circuit board. It should be taken into consideration here that although small sensor coils 1151 are sensitive to small objects 10, they are insensitive to objects 10 that are far away from the sensor coils 1151. Furthermore, large sensor coils 1151 can detect small objects 10 poorly. Uniform sensor coils 1151 do not take account of an inhomogeneity of the magnetic field during the operation of the charging units 100, 200. A large number of coil sizes and shapes of the sensor coils 1151 in turn requires a high application outlay on account of the different sensitivities. Finally, the objects 10 in the air gap, depending on position and size, influence a multiplicity of sensor coils 1151 simultaneously.

Figure 10:
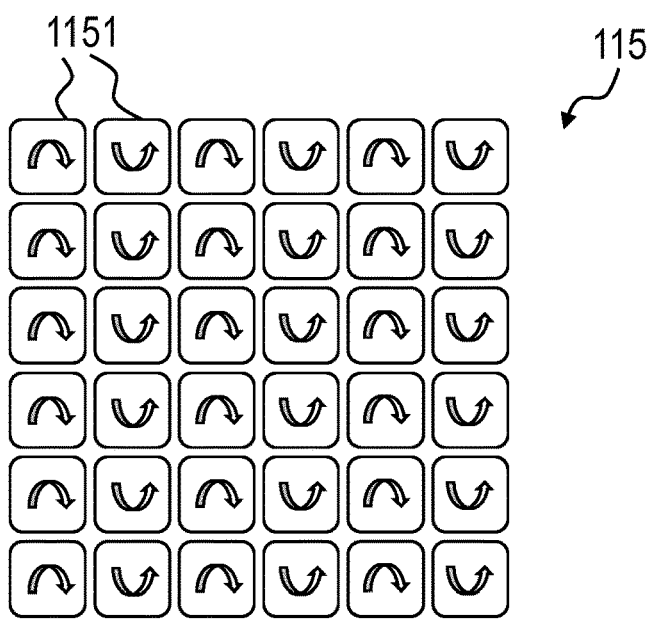
FIGS. 10 to 12 are an exemplary device for object recognition in the magnetic field in plan view and also a coil series thereof.

FIG. 10 shows an exemplary FOD unit 115 in plan view with thirty-six sensor coils 1151, which, in accordance with the number of sensor coils 1151, yields thirty-six different measurement values for the characteristic variables indicated in FIGS. 9A-9D.

Figure 11:
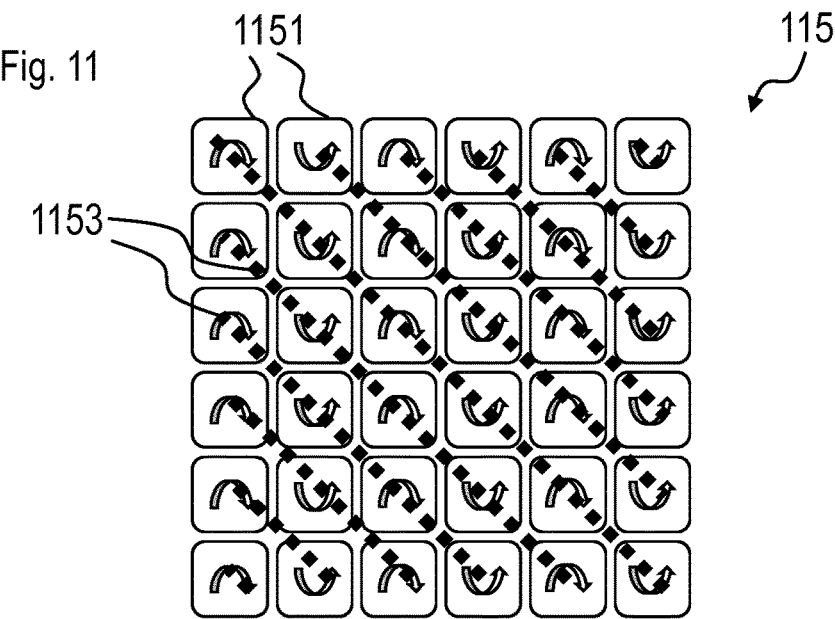

In order to prevent the number of evaluation circuits and processes from increasing unduly, the sensor coils 1151 can therefore be connected in series. In FIG. 11, the thirty-six sensor coils 1151 have been combined to form ten coil series 1153. As illustrated schematically on the basis of the arrows, here sensor coils 1151 respectively wound alternately in opposite senses are combined to form a coil series 1153.

Figure 12:
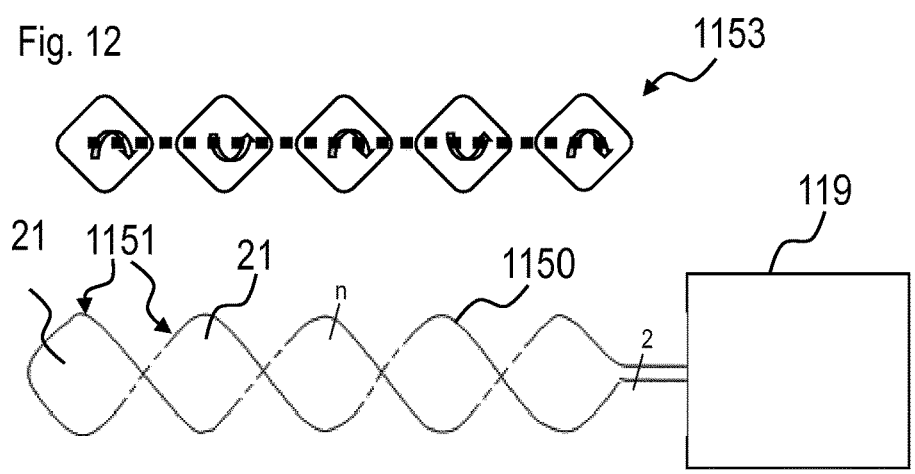
Figure 13:
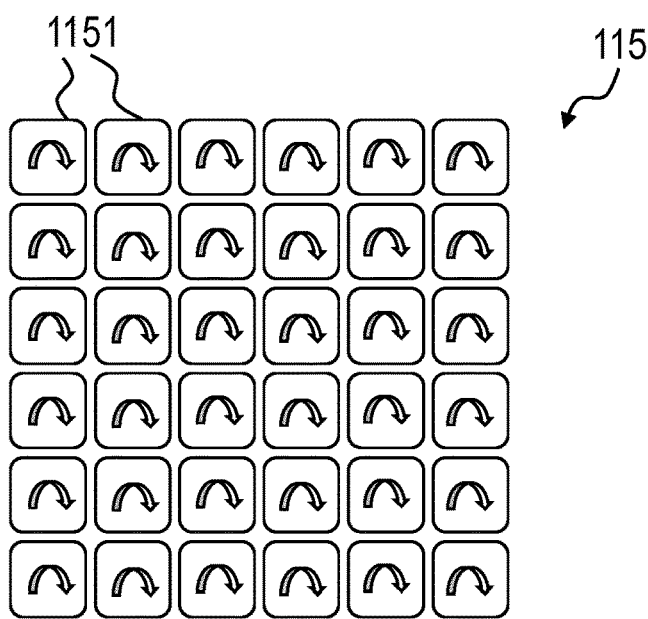
FIGS. 13 to 15 show an exemplary device for object recognition in the magnetic field in plan view and also a coil series thereof.
Figure 14:
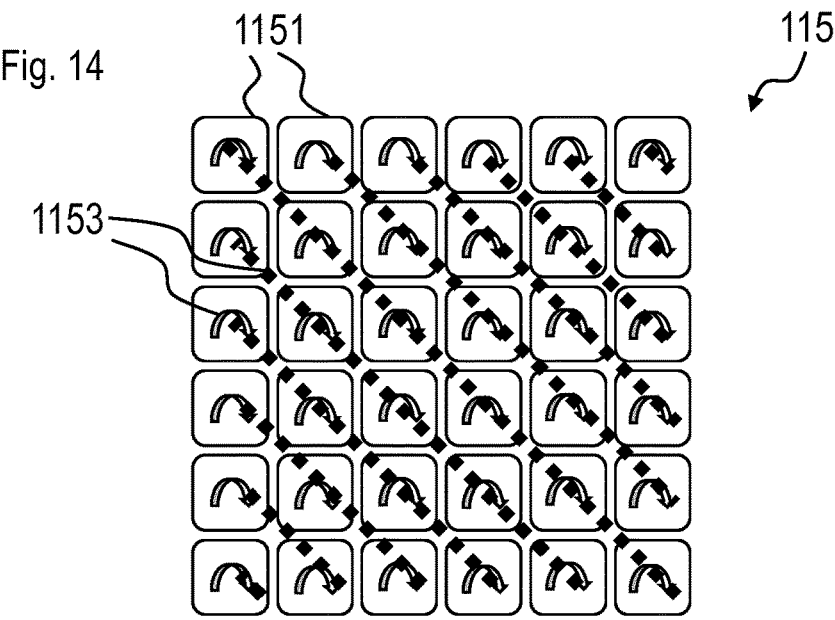

FIG. 12 shows a coil series 1153 having sensor coils 1151 wound in opposite senses. The coil series 1153 is realized by a sensor line 1150, for example, which is coupled by its beginning and end to the control unit 119 or evaluation electronics. The sensor line 1150 forms fine meshes 21 by way of example, wherein that part of the sensor line 1150 which is illustrated in a dashed manner respectively symbolizes a part of the sensor line 1150 that extends in the background. Each mesh 21 has only one turn in the present case. In a departure from this, the meshes 21 can also have a plurality of turns, that is to say as a generalization n turns (cf. FIG. 12). In this case, each of the coil series 1153 can be arranged above the respective coil 103, 203 such that the voltages induced by the energy transfer mutually almost completely compensate for one another.

Owing to the size of the region to be monitored, very large printed circuit boards are necessary, or it is even necessary to use a plurality thereof. This leads to high costs, since firstly the area of the printed circuit board(s) causes high costs. In the case of a plurality of printed circuit boards, an additional connection technique is necessary. In addition, on account of the size and standard production dimensions, a high degree of waste has to be taken into account. Furthermore, the printed circuit board has to be secured in the corresponding housing 101, 201 by way of corresponding devices. In particular, in the case of the first charging unit 100 it is necessary to ensure strength to withstand being driven over and, in the case of the second charging unit 200, it is necessary to ensure vehicle underbody requirements such as unproblematic placement on bollards or the like. This leads to an additional mechanical complexity of the charging units 100, 200.

Figure 28:
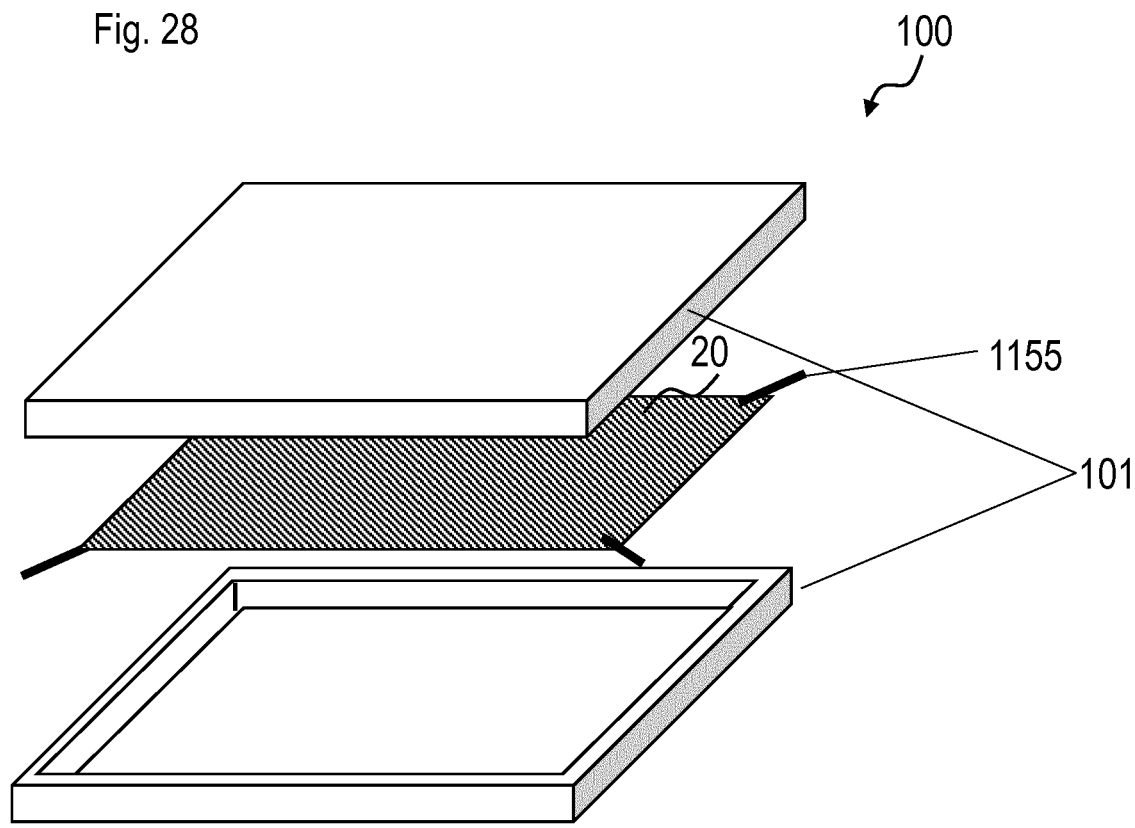
FIGS. 28 and 29 show one exemplary embodiment of an inductive charging unit.
Figure 29:
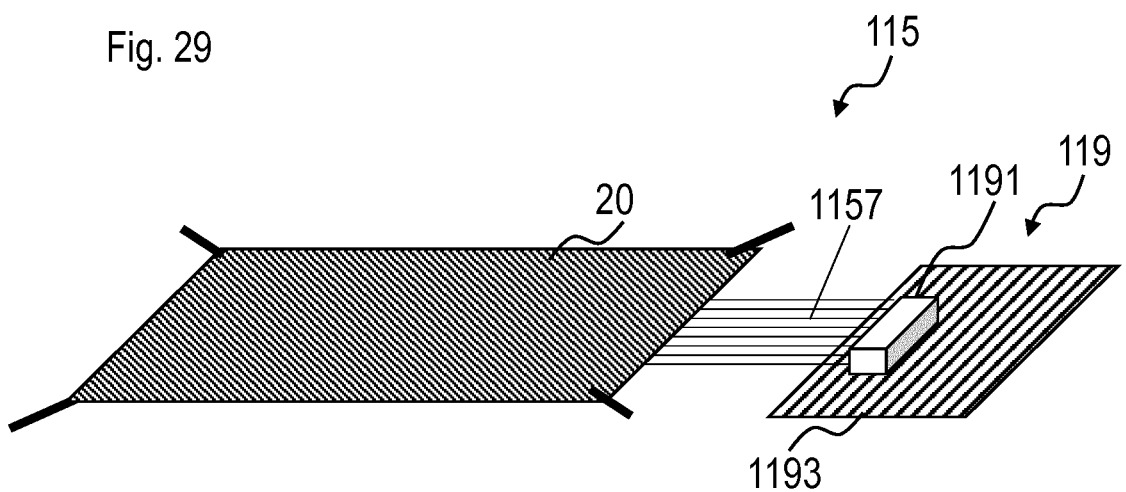

It is proposed to produce, instead of a circuit board, a meshwork 20 composed of enameled copper wire (FIGS. 13 to 27) and to integrate said meshwork 20 into the housing 101, 201 of the respective coil 103, 203 (FIGS. 28 and 29).

This makes use of the following insight, in particular: if a coil series 1153 covers both directions of the magnetic field during the operation of the charging units 100, 200, then the induced voltages almost completely compensate for one another even in the case of windings in the same sense. The coil series 1153 should be arranged for this purpose in such a way that the sum of the area elements of the sensor coils 1151 of the respective coil series 1153 multiplied by the flux density perpendicular thereto is approximately zero. This is the case for example for arrangement as illustrated in FIG. 5 of the FOD unit 115 from FIG. 13 with coupling of the sensor coils 1151 to form coil series 1153 according to FIG. 14.

Figure 15:
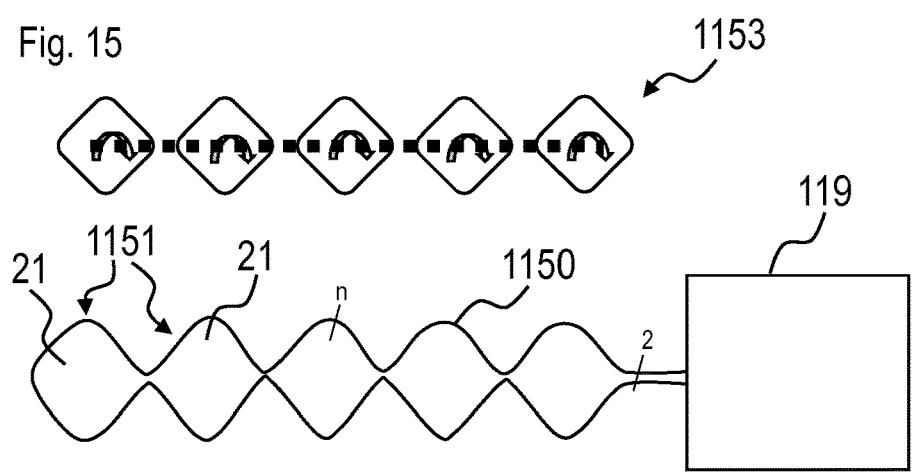

FIG. 15 shows a coil series 1153 having sensor coils 1151 wound in the same sense, analogously to FIG. 12. The coil series 1153 is once again realized by a sensor line 1150, for example, which is coupled by its beginning and end to the control unit 119 or evaluation electronics. The sensor line 1150 forms five meshes 21 by way of example. Each mesh 21 has only one turn in the present case. In a departure from this, the meshes 21 can also have a plurality of turns, that is to say as a generalization n turns (cf. FIG. 15). In this case, each of the coil series 1153 can be arranged above the respective coil 103, 203 such that the voltages induced by the energy transfer mutually almost completely compensate for one another.

Figure 16:
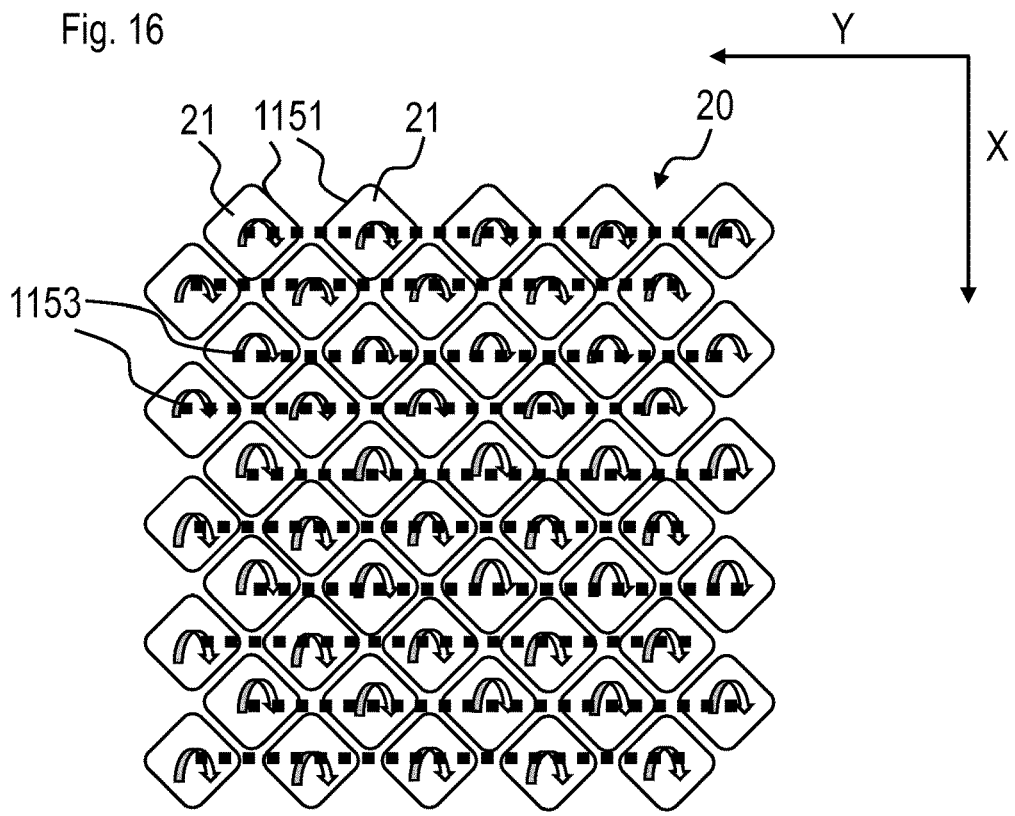
FIGS. 16 to 19 show a first exemplary embodiment of a meshwork for object recognition in the magnetic field.
Figure 17:
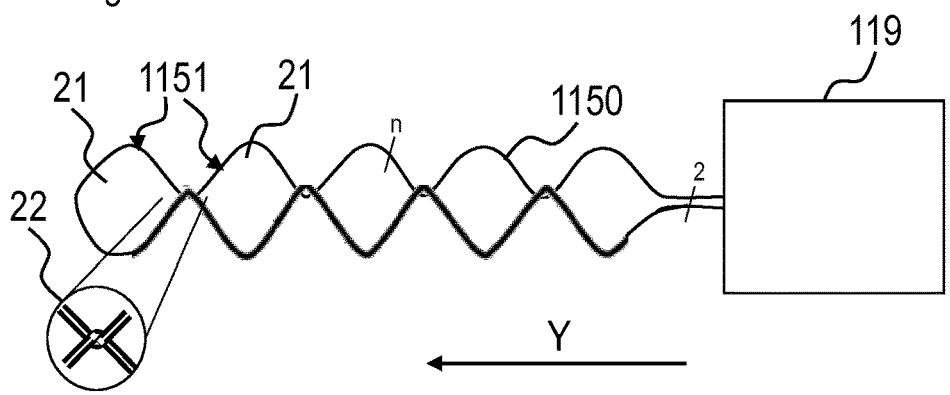
Figure 18:
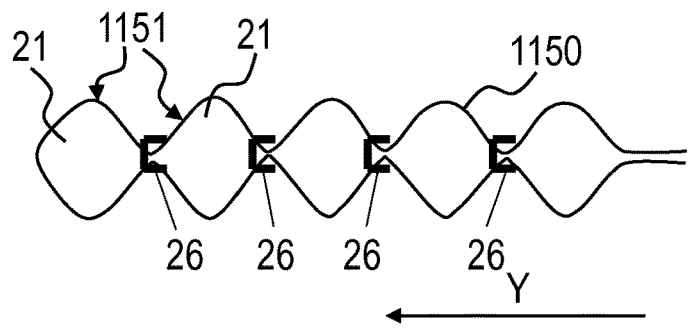

FIG. 16 shows a first exemplary embodiment of a meshwork 20, by way of example consisting of fifty sensor coils 1151, combined to form ten coil series 1153 each having five sensor coils 1151. The coil series 1153 are arranged in a manner strung together parallel to one another in the first direction X and extend in each case in the second direction Y.

In this case, analogously to FIG. 15, each coil series 1153 has a sensor line 1150 having sensor coils 1151 wound in the same sense, said sensor line being formed from enameled copper wire, for example. In contrast to FIG. 15, however, in a first embodiment variant (FIG. 17), the sensor line 1150 cross itself at a crossover point 22 in each case at the beginning and respectively end of each mesh 21 in relation to the second direction Y, thus giving rise to a braiding analogous to a wire mesh fence.

Additionally or alternatively, in a second embodiment variant (FIG. 18), the coil series 1153 can have a holder or clip 26, which holds the meshes 21 together, in each case at the beginning and respectively end of each mesh 21 in relation to the second direction Y.

Figure 19:
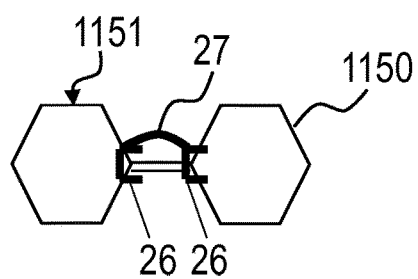
Figure 20:
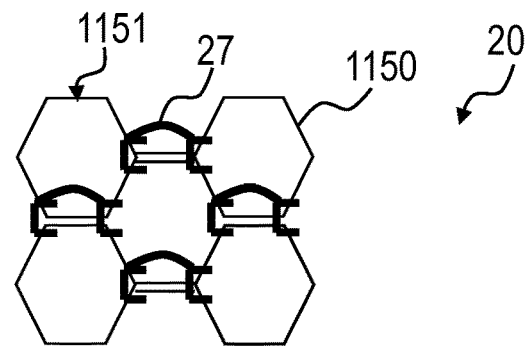
FIG. 20 shows a second exemplary embodiment of a meshwork for object recognition in the magnetic field.
Figure 21:
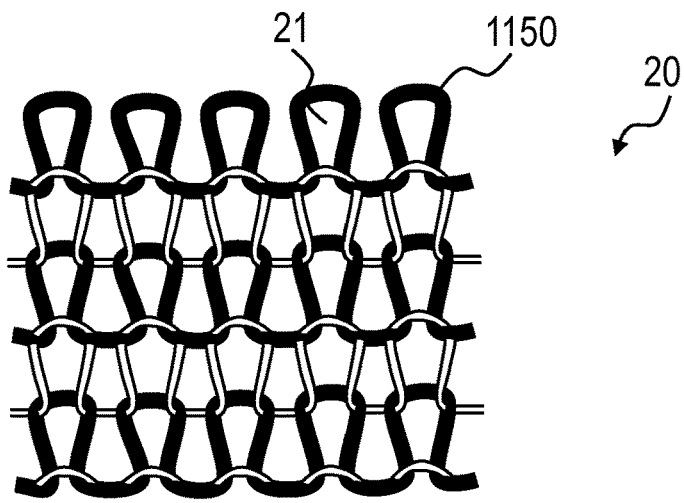
FIG. 21 shows a third exemplary embodiment of a meshwork for object recognition in the magnetic field.
Figure 22:
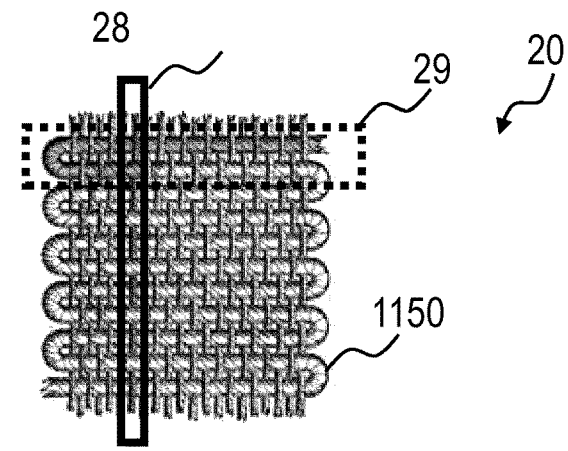
FIG. 22 shows a fourth exemplary embodiment of a meshwork for object recognition in the magnetic field.

As illustrated with reference to FIG. 19, such a construction of the meshwork 20 can be supplemented by a spacer 27. As a result, further area embodiments can be produced, for example, such as a hexagonal meshwork 20 in a second exemplary embodiment (FIG. 20).

In a third exemplary embodiment (FIG. 21), the meshwork 20 can alternatively also be produced by means of knitting or, in a fourth exemplary embodiment (FIG. 22), also in a manner resembling weaving. In the case of production by way of knitting, the shape of the meshes 21 can for example additionally be maintained by holders or clips 26 (cf. FIGS. 18 to 20). In the case of production resembling weaving, a warp thread 28 and weft thread 29 are used. Unlike in the case of weaving, however, a not very "widemeshed" product is designed. The weft threads 29 can be used together with a comb 24, 25 (cf. FIGS. 25A-25E) to the effect that the weft thread 29 clamps corresponding meshes 21.

Figure 23:
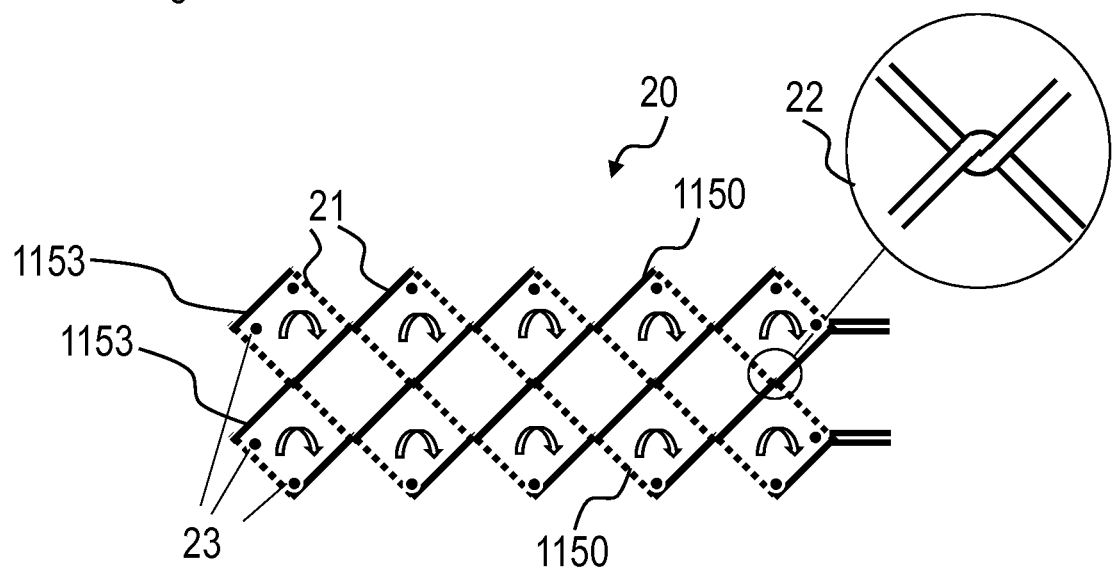
FIG. 23 shows coil series of the meshwork in accordance with the first exemplary embodiment.

FIG. 23 shows two coil series 1153 arranged parallel in accordance with the first embodiment variant of the first exemplary embodiment, wherein analogously to FIG. 12 once again that part of the sensor line 1150 which is illustrated in a dashed manner symbolizes in each case a part of the sensor line 1150 that extends in the background. Analogously to the crossing of the respective sensor line 1150 between the meshes 21 of the respective coil series 1153, here the sensor lines 1150 are also concatenated together at a crossover point 22 at the beginning and respectively end of each mesh 21 in relation to the first direction X.

In addition, the meshwork 20 can have fixing points 23 at the edge, at which fixing points said meshwork can be clamped.

A free space between the two parallel coil series 1153 can be covered for example by stacking an additional coil series 1153 of a further meshwork in the third direction Z, said stacking being offset in the first and second directions X, Y.

Alternatively, as illustrated with reference to FIG. 24, in a fifth exemplary embodiment, the meshwork 20 from FIG. 23 can be completed to form a more complex meshwork 20 by a further coil series 1153 being braided into the existing crossover points 22.

A method for producing the meshwork 20 from FIG. 23 is explained below with reference to FIGS. 25A to 25E.

In a first step (FIG. 25A), a sensor line 1150 is led through existing meshwork 20 in the second direction Y, existing meshes 21 being forced apart.

In a subsequent second step (FIG. 25B), a first comb 24 pulls a led-through section of the sensor line 1150 in the first direction X.

In a subsequent third step (FIG. 25C), a remaining section of the sensor line 1150 is threaded back through the meshes 21 newly clamped as a result of the second step, counter to the second direction Y. As in the first step, these meshes 21 for this purpose are forced apart perpendicular to the plane of the illustration.

In a subsequent fourth step (FIG. 25D), a second comb 25 then pulls down in the first direction X that section of the sensor line 1150 that was threaded in in the third step, with the result that once again new meshes 21 are clamped.

A subsequent fifth step (FIG. 25E) substantially corresponds to the first step. The first to fourth steps are repeated in order to realize a plurality of turns.

Figure 26:
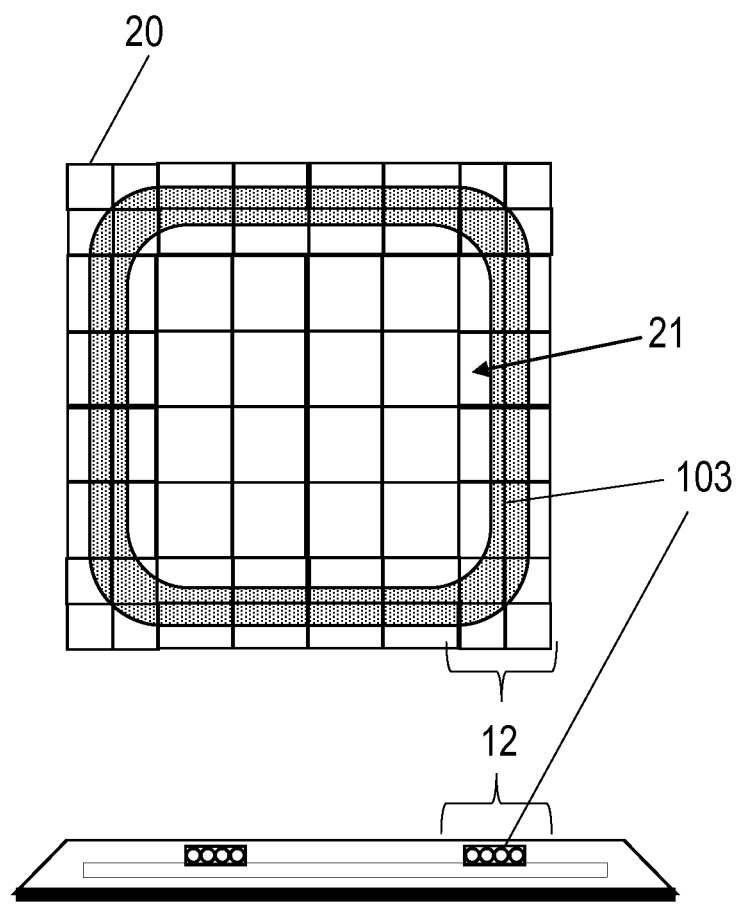
FIG. 26 shows a sixth exemplary embodiment of a meshwork for object recognition in the magnetic field.
Figure 27:
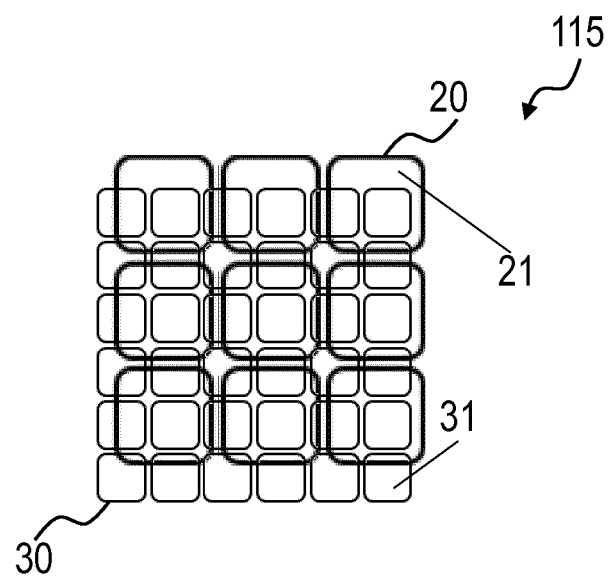
FIG. 27 shows a seventh exemplary embodiment of a meshwork for object recognition in the magnetic field.

FIG. 26 shows a sixth exemplary embodiment of a meshwork 20 in plan view and sectional view above the primary coil 103. In addition to the previous exemplary embodiments, the meshwork 20 has meshes 21 of different sizes. In particular, an area in a region 12 of increased flux density above the windings of the primary coil 103 is adapted to the flux density.

Figure 24:
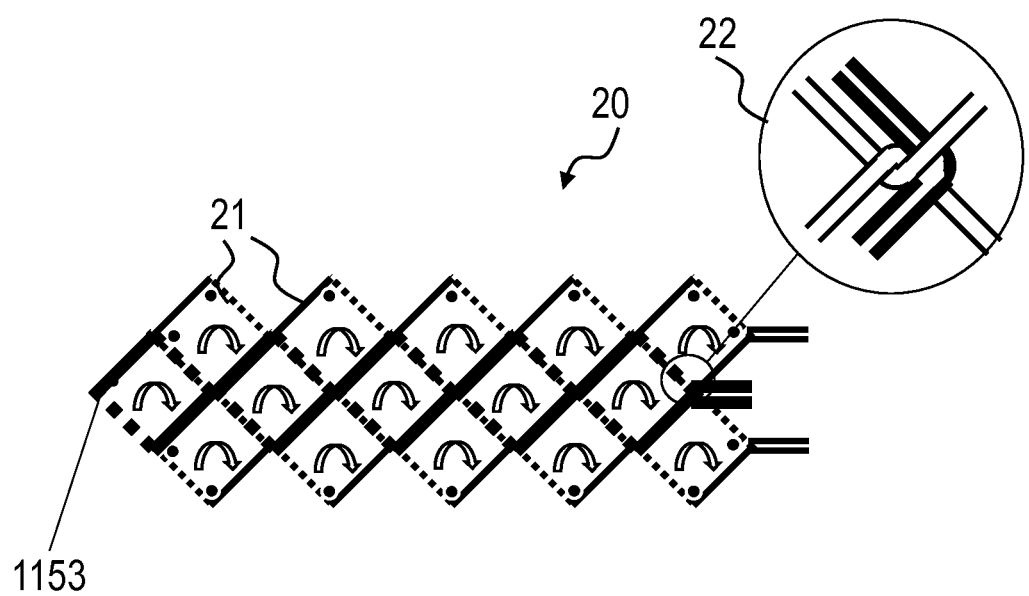
FIG. 24 shows a fifth exemplary embodiment of a meshwork for object recognition in the magnetic field.
Figure 25A:
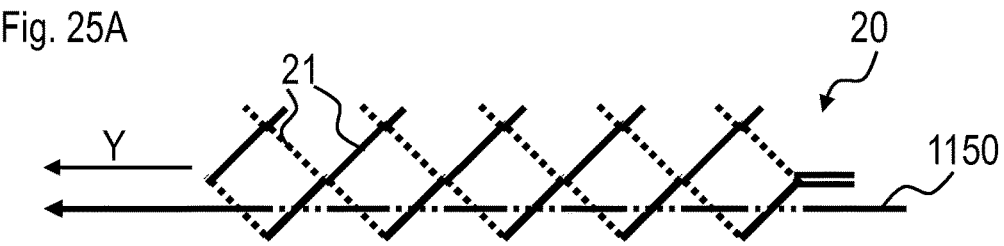
FIGS. 25A to 25E show an exemplary method for producing the meshwork in accordance with the first exemplary embodiment.
Figure 25B:
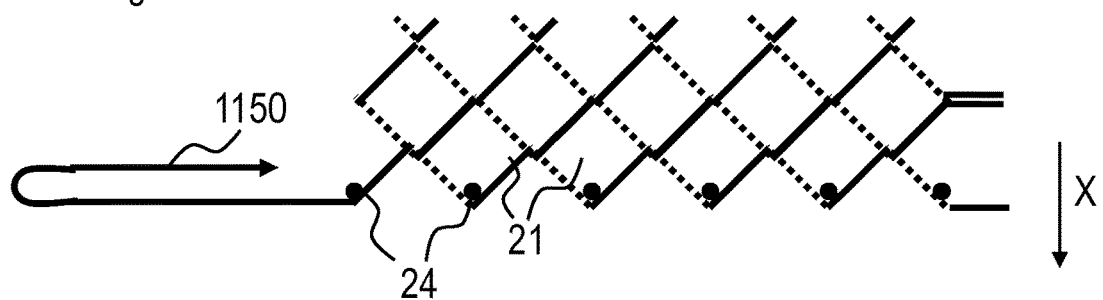
Figure 25C:
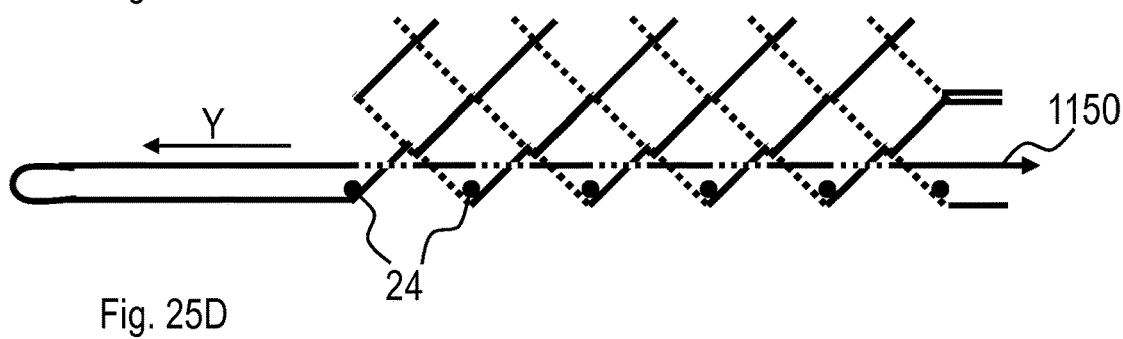
Figure 25D:
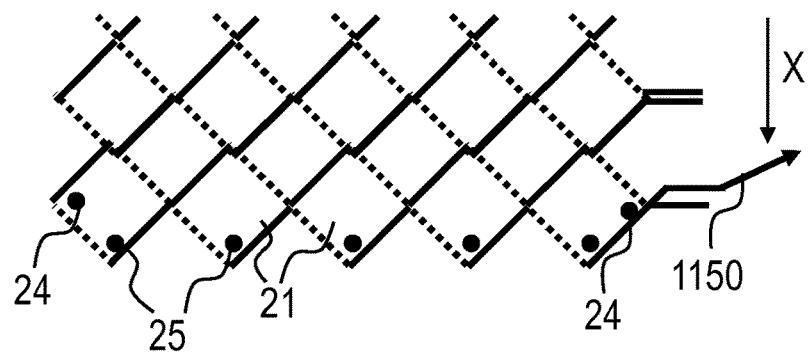
Figure 25E:
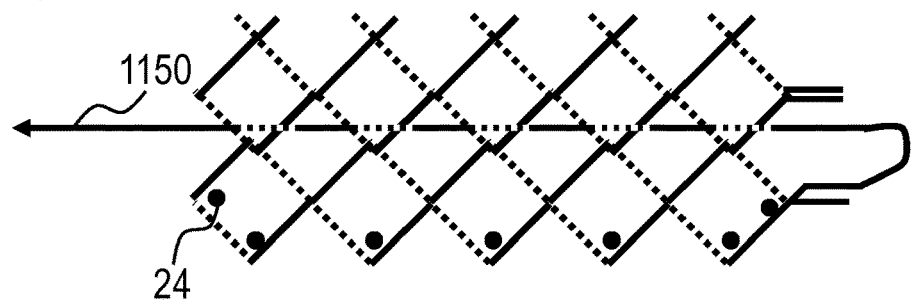

Alternatively or additionally, as already mentioned in association with FIGS. 23, 24, it is possible moreover for a plurality of meshworks to be arranged one above another. In the seventh exemplary embodiment illustrated in FIG. 27, two meshworks 20, 30 having different mesh sizes are illustrated in a manner placed one above the other and displaced slightly relative to one another. The meshes 21 of the first meshwork 20 are approximately double the size of the meshes 31 of the second meshwork 30.

FIG. 28 shows one exemplary embodiment of a first inductive charging unit 100. The first charging unit 100 includes a housing 101 having for example two die-cast shaped parts.

The cover surface of the housing 101, which faces a second inductive charging unit upon coupling thereto, is formed in particular from a non-conductive material such as plastic or fiber composite materials. This enables a simple integration of the meshwork 20 into the housing 101. In particular, the meshwork 20 can be integrated into the housing 101 by means of lamination into plastic.

By way of example, the meshwork 20 includes holding elements 1155 at its corners, said holding elements clamping the meshwork 20 in the correct position. These can be concomitantly cast in, for example.

As illustrated in FIG. 29, sensor lines 1150 as a flexible connection 1157 can be led from the meshwork 20 in a corresponding length e.g. to a plug connector 1191 arranged on a circuit board 119 of the control unit 119.

The meshwork 20 is advantageously free of a carrier circuit board. Furthermore, the sensor coils 1151 are not merely embroidered onto a support web, rather a support web is produced from coil structures. The latter can be cast directly into plastic. The meshwork 20 is thus itself the support web.

Individual sensor coils 1151 can be connected in series in this case. The meshwork 20 can advantageously be integrated into existing housing component parts in a simple manner. The sensor lines 1150 clamping the meshwork 20 can simultaneously serve to form a connection line 1157 through to the control unit 119 of the evaluation electronics. Methods of wire meshing production and/or additional notifications thereof can be used for producing the meshwork 20. Further methods, such as those from textile production, can also be used in this case. By varying the mesh areas within a meshwork 20, it is possible to take account of inhomogeneous requirements within the overall area of an FOD unit 115. Furthermore, a simple adaptation of the geometry of the meshes 21 can be effected by using additional holders and clips 26. With the use of a plurality of meshworks 20 one above another, it is advantageously possible to realize very dense nets having different mesh sizes.

LIST OF REFERENCE SIGNS

X, Y, Z Directions
10 Foreign body
11 Field-free region
12 Region of increased flux density
20 Meshwork
21 Mesh
22 Crossover point
23 Fixing point
24 First comb
25 Second comb
26 Clip
27 Spacer
28 Warp thread
29 Weft thread
30 Meshwork
31 Mesh
100 First charging unit
101 Housing
103 Primary coil
105 Ferrite
111 Resonance capacitor
113 Positioning unit
115 FOD unit
1150 Sensor line
1151 Sensor coil
1153 Coil series
1155 Holding element
1157 Connection
117 Temperature sensor
119 Control unit
1191 Plug connector
1193 Circuit board
120 Wall unit
121-129 Input
200 Second charging unit
201 Housing
203 Secondary coil
205 Ferrite
215 FOD unit
d Distance
B Magnetic field line
I Current flow
T Penetration depth The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A meshwork for object recognition in a magnetic field, comprising:
    a plurality of sensor lines, wherein
    the sensor lines are arranged in a manner strung together parallel to one another in a first direction,
    the sensor lines span a plurality of meshes in a second direction extending transversely with respect to the first direction, and
    the meshes of adjacent sensor lines are respectively coupled to one another such that the sensor lines form the meshwork; and
    coupling elements, wherein the meshes of adjacent sensor lines are respectively coupled to one another by way of a coupling element.

2. The meshwork according to claim 1, wherein the meshes of adjacent sensor lines respectively intermesh, such that the meshwork is formed in a concatenated fashion.

3. The meshwork according to claim 2, further comprising:
coupling elements, wherein the meshes of adjacent sensor lines are respectively coupled to one another by way of a coupling element.

4. The meshwork according to claim 3, wherein
the sensor lines respectively have a first section extending in the second direction and a second section extending counter to the second direction, and
each of the meshes is formed from the first and second sections, and the sensor line is formed in such a way that the second section crosses over the first section at a beginning of each mesh in relation to the second direction and/or at an end of each mesh in relation to the second direction.

5. The meshwork according to claim 1, wherein
the sensor lines respectively have a first section extending in the second direction and a second section extending counter to the second direction, and
each of the meshes is formed from the first and second sections, and the sensor line is formed in such a way that the second section crosses over the first section at a beginning of each mesh in relation to the second direction and/or at an end of each mesh in relation to the second direction.

6. The meshwork according to claim 1, further comprising:
coupling elements, wherein
the sensor lines respectively have a first section extending in the second direction and a second section extending counter to the second direction,
each mesh is formed from the first and second sections, and
the second section is respectively coupled to the first section by way of a coupling element at a beginning of each mesh in relation to the second direction and/or at an end of each mesh in relation to the second direction.

7. The meshwork according to claim 1, wherein the meshes respectively enclose an area whose size varies in such a way that a size ratio of the areas with respect to one another is between 0.5 and 2.

8. A device for object recognition in a magnetic field, comprising:
a first meshwork according to claim 1; and
evaluation electronics for object recognition, which are coupled to the sensor lines of the first meshwork in terms of signaling.

9. The device according to claim 8, further comprising:
a further meshwork according to claim 1, wherein
the further meshwork is arranged at a distance from the first meshwork parallel to the first meshwork in a third direction extending transversely with respect to the first and second directions, and
the sensor lines of the further meshwork are coupled to the evaluation electronics in terms of signaling.

10. The device according to claim 9, wherein
the meshes of the first meshwork respectively enclose a first area, and
the meshes of the further meshwork respectively enclose a further area, wherein a size ratio of the first area to the further area is between 0.5 and 2.

11. An inductive charging unit for a vehicle, comprising:
a primary coil for inductive coupling to a secondary coil assigned to the vehicle; and
a device for object recognition according to claim 8.

12. The inductive charging unit according to claim 11, wherein the device is arranged in such a way that voltages induced in the meshes by a magnetic field of the primary coil during operation of the inductive charging unit respectively compensate for one another.

13. The inductive charging unit according to claim 11, further comprising:
a housing with holding elements, wherein the meshwork is clamped in a fixing fashion in the housing by way of the holding elements.

14. An inductive charging unit for a vehicle, comprising:
a secondary coil for inductive coupling to a primary coil assigned to a ground unit; and
a device for object recognition according to claim 8.

15. The inductive charging unit according to claim 14, further comprising:
a housing with holding elements, wherein the meshwork is clamped in a fixing fashion in the housing by way of the holding elements.

16. A method for producing a meshwork for object recognition in a magnetic field, the method comprising the acts of:
providing a plurality of sensor lines;
arranging the sensor lines in a manner strung together parallel to one another in a first direction, in such a way that the sensor lines respectively span a plurality of meshes in a second direction extending transversely with respect to the first direction;
respectively coupling the meshes of adjacent sensor lines to one another, such that the sensor lines form the meshwork;
a) providing a first sensor line of the plurality of sensor lines, which forms a plurality of first meshes;
b) providing a further sensor line of the plurality of sensor lines having a first and a second section; and
c) arranging the sensor lines in a manner strung together parallel to one another in the first direction in such a way that the sensor lines respectively span a plurality of meshes in the second direction extending transversely with respect to the first direction, and respectively coupling the meshes of adjacent sensor lines to one another, such that the sensor lines form the meshwork, by carrying out the following steps of:
c1) guiding the further sensor line in the second direction through the first meshes in such a way that the first section of the further sensor line crosses over the first sensor line at a beginning of each first mesh in relation to the second direction and at an end of each first mesh in relation to the second direction,
c2) pulling the first section of the further sensor line by way of a first comb respectively between crossover points of the first and further sensor lines in the first direction, such that an area segment is respectively enclosed between the first section of the further sensor line and the first meshes,
c3) guiding the second section of the further sensor line counter to the second direction through the area segments, in such a way that the second section of the further sensor line crosses over the first section of the further sensor line at an end of each first mesh in relation to the second direction and at a beginning of each first mesh in relation to the second direction, and
c4) pulling the second section of the further sensor line by way of a second comb respectively between crossover points of the first and second sections of the further sensor line in the first direction, such that further meshes are respectively formed by the first and second sections of the further sensor line.

17. The method according to claim 16, wherein
an end of the second section that is guided out of the meshwork counter to the second direction serves as further sensor line having a respective first and second section, and
steps c1) to c4) are carried out once again.

18. The method according to claim 16, wherein the meshwork is produced by one of either embroidering, weaving or clipping of the sensor lines.

* * * * *